(12) United States Patent
Enomoto

(10) Patent No.: US 6,417,978 B1
(45) Date of Patent: Jul. 9, 2002

(54) RECORDING MEDIUM SEARCHING METHOD AND RECORDING MEDIUM PROCESSING DEVICE USING THE SAME METHOD

(75) Inventor: Masataka Enomoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/219,581

(22) Filed: Dec. 23, 1998

(30) Foreign Application Priority Data

Dec. 25, 1997  (JP) ............................................. 9-358268

(51) Int. Cl.⁷ ............................................. G11B 15/18
(52) U.S. Cl. ...................................... 360/72.2; 360/74.1
(58) Field of Search ........................ 360/69, 72.1, 72.2, 360/74.1, 74.4, 74.5; 386/46, 69

(56) References Cited

U.S. PATENT DOCUMENTS

| | | | | |
|---|---|---|---|---|
| 5,121,269 A | * | 6/1992 | Tsuchida et al. ............ | 360/72.2 |
| 5,359,472 A | * | 10/1994 | Motohashi .................. | 360/72.2 |
| 5,432,657 A | * | 7/1995 | Akama ....................... | 360/74.1 |
| 5,475,542 A | * | 12/1995 | Bentley et al. ............. | 360/74.1 |
| 5,757,572 A | * | 5/1998 | Sasaki ....................... | 360/72.2 |
| 5,936,786 A | * | 8/1999 | Go ............................ | 360/72.2 |

FOREIGN PATENT DOCUMENTS

JP              6-84229          *  3/1994

* cited by examiner

*Primary Examiner*—Andrew L. Sniezek
(74) *Attorney, Agent, or Firm*—Frommer Lawrence & Haug LLP; William S. Frommer (57) ABSTRACT

When a program PA (0) is searched, the tape position for search starting is identified. A detection area is set based on the tape position and the record position of the program PA (0). The tape is fed fast to the tape trailing side of the detection area, and rewinding reproduction is operated from the tape trailing side in the detection area at such a tape speed as detectable of a control signal or index signal. By detecting the index signal, the program PA (0) is searched. Alternatively, the program is searched by detecting the position where the control signal is lost. For searching a blank portion, fast reproduction is operated from the tape leading side of the detection area. The blank portion is detected at the position where any one of the position of lost control signal and the position of the index signal is detected first. As described herein above, an event recorded in a recording medium or a blank portion of a recording medium is searched easily and precisely.

14 Claims, 12 Drawing Sheets

| 2/21 | MON | A.M. 8:00 | 8CH |
|---|---|---|---|
| 1/31 | MON | A.M.10:00 | 8CH |
| 12/1 | TUE | A.M.11:00 | 6CH |
| 10/3 | WED | A.M. 0:00 | 10CH |
| 9/31 | THU | P.M.10:00 | 1CH |
| BLANK | | | 1HOOM |

RECORDING MEDIUM SEARCHING METHOD AND RECORDING MEDIUM PROCESSING DEVICE USING THE SAME METHOD

BACKGROUND OF THE INVENTION

1. Field of the Invention

This invention relates to a recording medium searching method and a recording medium processing device. In particular, this invention relates to a method and device in which record position information of an event recorded in a recording medium is stored in memory means provided on the recording medium, and the event recorded in the recording medium or a blank portion of the recording medium is searched. using the record position information recorded in the memory means.

2. Background of the Invention

Heretofore, in the case that an event is recorded in a recording medium, for example, in the case that a program is recorded in a video cassette, the position of a program is searched to reproduce the desired program out of recorded programs, or a blank portion, namely the position where a program is not recorded or a record position of an unnecessary program, is searched to record a new program.

In such operation for searching a program or blank portion, fast feeding and rewinding or fast reproduction and rewinding reproduction of a video tape are repeated to detect the position with viewing the displayed image. Alternatively, an index signal is recorded in a control track of a video tape when recording of a program starts, and the index signal is used for searching the position of the desired program.

Neither by the method for detecting the position with viewing the displayed image while fast feeding and rewinding or fast reproduction and rewinding reproduction of a video tape are repeated nor by the method which uses an index signal, a record position of a program or a blank portion can not be searched easily unless the record position of a desired program or the position of a blank portion is kept in memory.

SUMMARY OF THE INVENTION

It is an object of the present invention to provide a recording medium searching method and a recording medium processing device using this method which are capable of searching easily an event recorded in a recording medium and a blank portion of a recording medium precisely.

In a recording medium searching method in accordance with the present invention, a memory means is provided on a recording medium, the record position information of an event recorded in the recording medium is stored in the memory means, and searching is operated using the record position information stored in the memory means when the event recorded in the recording medium or an blank portion of the recording medium is searched.

A recording medium processing device is provided with an information read out means for reading out the record position information of an event recorded in a recording medium from a memory means provided on the recording medium, a reproduction means for reproducing the recording medium, and a control means for controlling operation of the information read out means and the reproduction means, wherein when an event recorded in the recording medium or a blank portion of the recording medium is searched, the control means controls the information read out means to read out the record position information from the memory means, and controls the reproduction means so as to search using the read out record position information.

In the present invention, the record position information of an event to be recorded in this recording medium is stored in the memory means provided on the recording medium, and when, for example, a program recorded in the recording medium or a blank portion of the recording medium is searched, searching is operated using the record position information stored in the memory means. In the program searching operation for searching a program recorded in the recording medium, a detection area is set based on the record position information, the position where a control signal recorded with the program or an index signal recorded when the program recording is started is detected from the trailing side of the detection area, and the position of the program is detected based on the position detected first.

On the other hand, in the blank searching operation for searching a blank in the recording medium, a detection area is set based on the record position information, the position where the control signal is lost or the index signal of an unnecessary program is detected, and the position of the blank is detected based on the position detected first.

DETAILED DESCRIPTION OF THE PREFERRED EMBODIMENTS

Figure 1:
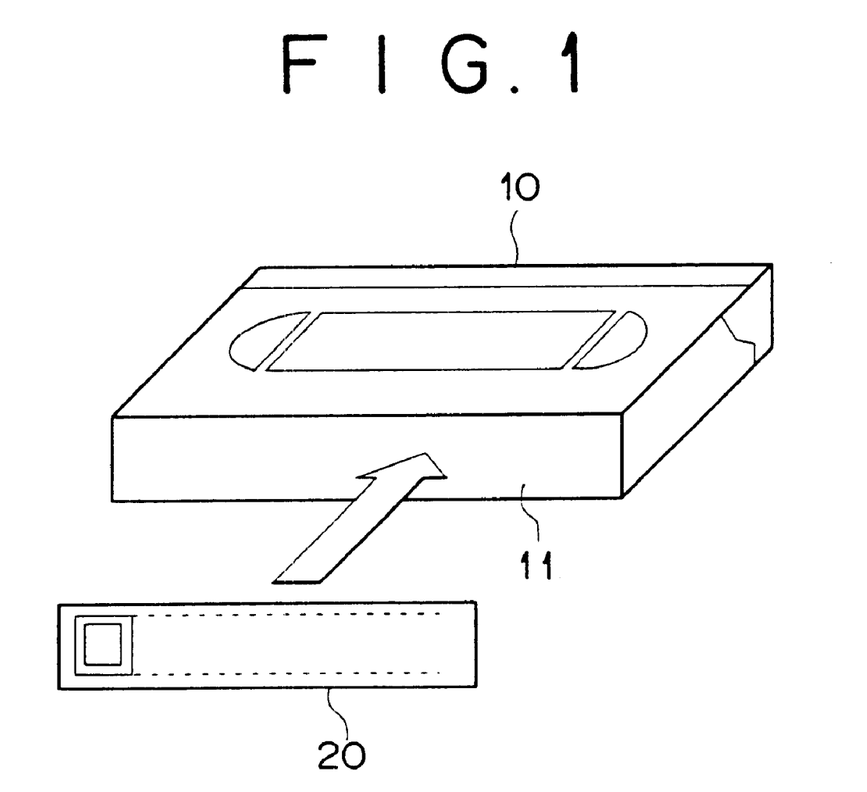
FIG. 1 is a diagram for illustrating a video cassette 10 to which a memory card 20 is attached.

The embodiments of the present invention will be described in detail hereinafter with reference to the drawings. FIG. 1 shows a video cassette, in a recess 11 provided on a box of the video cassette 10, for example, a non-contact type memory card (refereed to as simply memory card hereinafter) 20 is attached as an auxiliary memory device namely a memory means.

Figure 2:
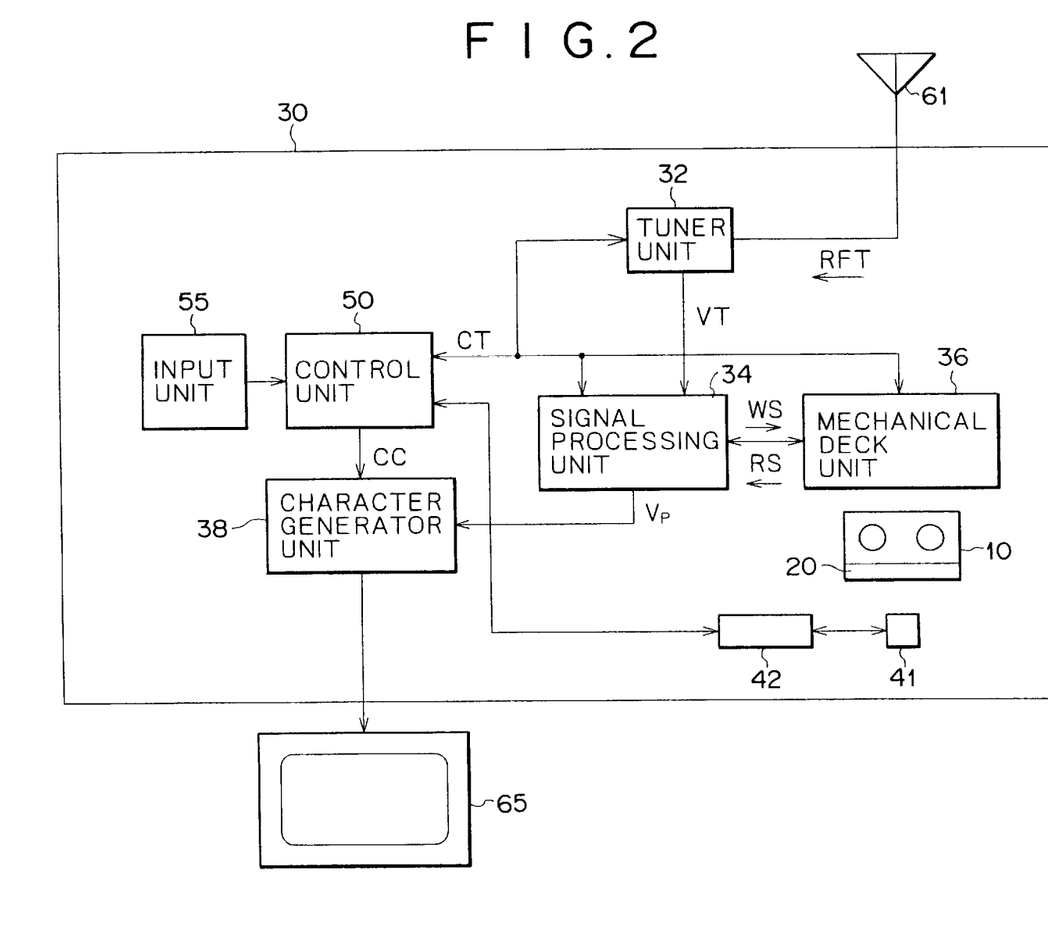
FIG. 2 is a diagram for illustrating a structure of a video tape recorder 30.

When the video cassette 10 to which the memory card 2 has been attached is attached on a video tape recorder 30 shown in FIG. 2, the antenna 41 provided in the video tape recorder 30 is located at the position facing to the memory card 20 which has been attached to the video cassette 10. A transmission/reception processing unit 42 is connected to the antenna 41, and a control unit 50 comprising a microcomputer is connected to the transmission/reception processing unit 42, and the memory card 20 and control unit 50 communicate each other therebetween.

Figure 3:
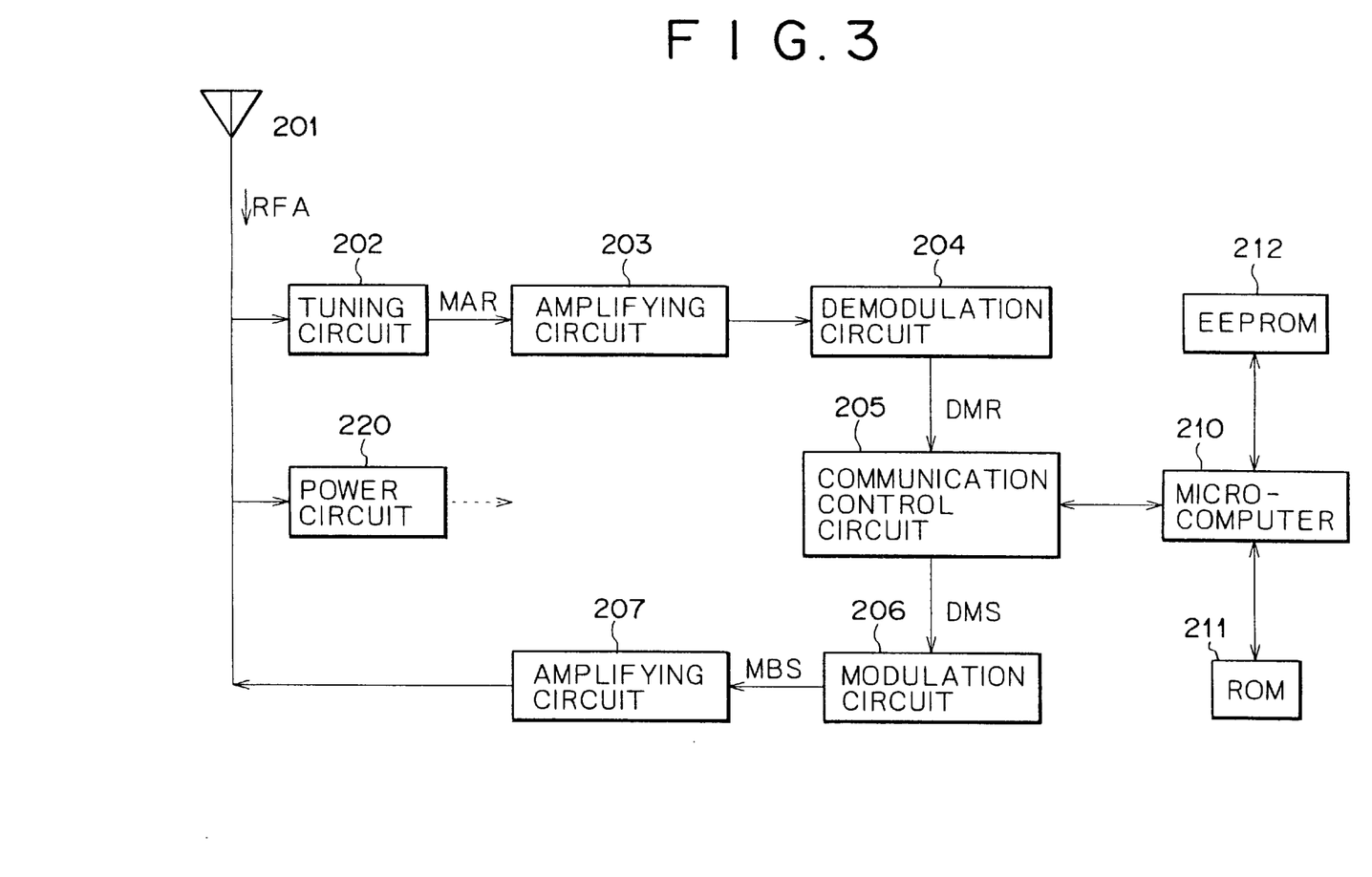
FIG. 3 is a diagram for illustrating a structure of a memory card 20.

The memory card 20 has a structure as shown in FIG. 3, and the antenna 201 receives radio wave from the antenna 41. A signal RFA received by the antenna 201 is supplied to a tuning circuit 202 and a power supply circuit 220.

In the tuning circuit 202, a modulated signal MAR having a prescribed carrier frequency is selected out of the signal RFA supplied from the antenna 201. The modulated signal MAR obtained in the tuning circuit 202 is amplified to a prescribed level by an amplifying circuit 203, and supplied to the demodulating circuit 204. In the demodulating circuit 204, the modulated signal MAR is demodulated and converted to a reception data signal DMR. The reception data signal DMR is supplied to a microcomputer 210 through a communication control circuit 205.

A read only memory (ROM) 211 is connected to a microcomputer 210, each section of the memory card 20 is controlled according to a control program stored in the ROM 211. An electrically erasable and programmable read only memory (EEPROM) 212 is connected to the microcomputer 210, the information in the supplied reception data signal DMR which relates to the program (such as recording data, record starting time, channel number, and record position of the program) is stored in the EEPROM 212.

The microcomputer 210 reads out the information stored in the EEPROM 212, a transmission data signal DMS is generated, and then the transmission data signal DMS is supplied to a modulating circuit 206 through the communication control circuit 205.

In the modulating circuit 206, the supplied transmission data signal DMS is modulated to a signal having a prescribed carrier frequency. The modulated signal MBS obtained by the modulating circuit 206 is amplified to a sufficient signal level required for communication in an amplifying circuit 207, and then supplied to the antenna 201, a modulated signal MBS having a carrier frequency is transmitted from the antenna 201.

In the power supply circuit 220, power required for the memory card 20 is generated using the signal RFA supplied from the antenna 201.

Figure 4:
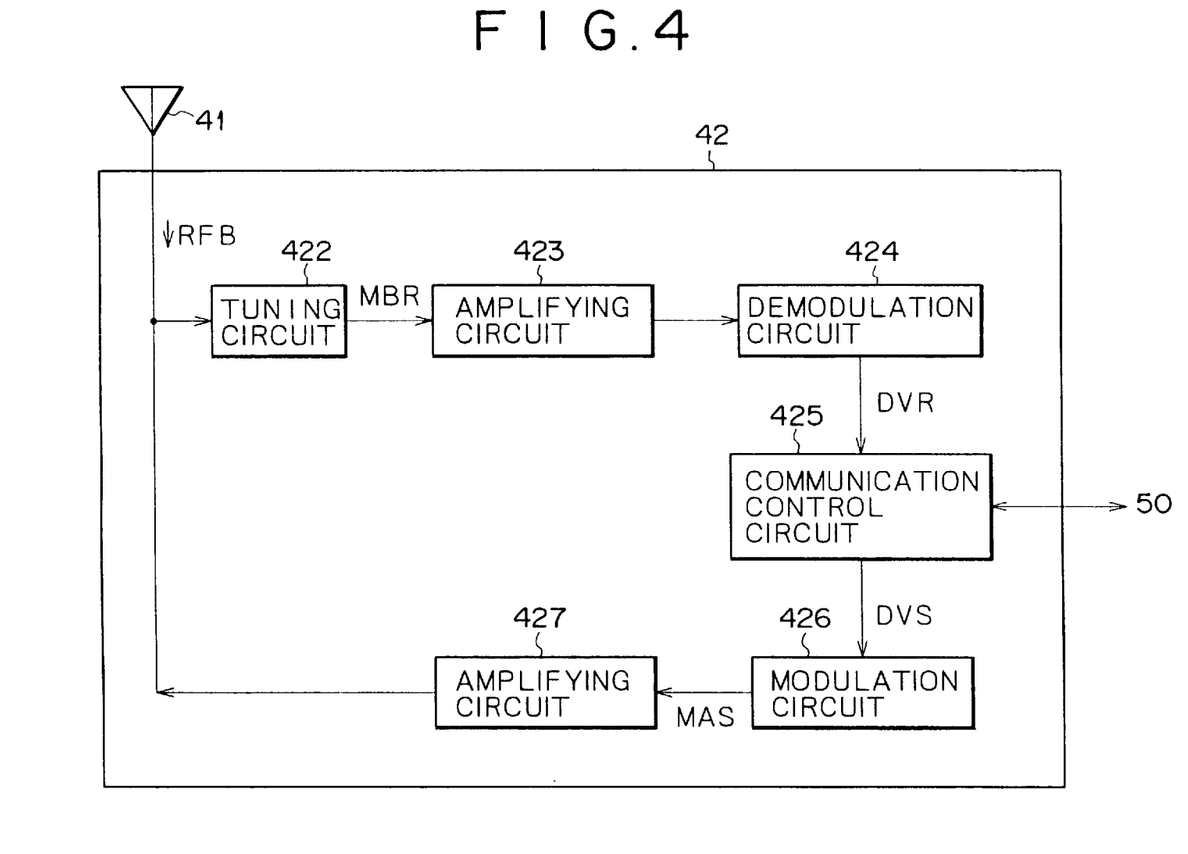
FIG. 4 is a diagram for illustrating a structure of a transmission/reception processing unit 42.

FIG. 4 shows the structure of the transmission/reception processing unit 42 that is an information reading means, the antenna 41 receives radio wave transmitted from the antenna 201 of the memory card 20. The signal RFB received by the antenna 41 is supplied to a tuning circuit 422.

In the tuning circuit 422, a modulated signal MBR having a prescribed carrier frequency is selected out of the signal RFB. The modulated signal MBR obtained in the tuning circuit 422 is amplified to a prescribed level by an amplifying circuit 423 and supplied to a demodulating circuit 424. In the demodulating circuit 424, the modulated signal MBR is demodulated and converted to a reception data signal DVR. The reception data signal DVR is supplied to the control unit 50 through the communication control circuit 425.

When a transmission data signal DVS having the information which indicates a program is supplied from the control unit 50, the transmission data signal DVS is supplied to the modulating circuit 426 through the communication control circuit 425.

In the modulating circuit 426, the supplied transmission data signal DVS is modulated to a signal having a prescribed carrier frequency. The modulated signal MAS obtained in the modulating circuit 426 is amplified to a sufficient signal level required for the amplifying circuit 427 to communicate and then supplied to the antenna 41, and the modulated signal MAS having the carrier frequency is transmitted from the antenna 41.

The signal RFT obtained when the antenna 61 shown in FIG. 2 receives broadcast wave is supplied to a tuner unit 32. The tuner unit 32 selects a broadcast wave having a desired frequency and an image signal VT is generated. The image signal VT is supplied to a signal processing unit 34. The signal processing unit 34 processes the image signal VT to generate a recording signal WS. The recording signal WS is supplied to a mechanical deck unit 36, and recorded in video tape in the video cassette 10 by means of a rotary head (not shown in the drawing) of the mechanical deck unit 36.

When a video tape is reproduced, a reproducing signal RS is supplied from the mechanical deck unit 36 which constitutes a reproducing means to the signal processing unit 34. The signal processing unit 34 processes the reproducing signal RS to generate a reproducing image signal VP. The reproducing image signal VP is supplied to a character generator unit 38.

The character generator unit 38 generates an image signal VC for displaying the information which indicates the program based on a control signal CC supplied from the control unit 50. Further, in the character generator unit 38, a signal which has been formed by superimposition of the generated image signal VC on the reproducing image signal VP supplied from the signal processing unit 34 is sent out from the video tape recorder 30 as an image output signal VOUT. Alternatively, any image signal one of the reproducing image signal VP and the generated image signal VC is regarded as an image output signal VOUT, and sent out from the video tape recorder 30. The image output signal VOUT is supplied to a display device 65, as the result a reproduced image or information is displayed on the screen of the display device 65.

The control unit 50 of the video tape recorder 30 generates a control signal CT for controlling the tuner unit 32, signal processing unit 34, and mechanical deck unit 36, and performs communication with the memory card 20 attached to the video cassette 10. A control signal CC is generated based on the reception data signal DVR supplied from the transmission/reception processing unit 42. An input unit 55 is connected to the control unit 50, operation of the video tape recorder 30 is switched by operating the input unit 55. Alternatively, the operation may be switched by operating a remote control device or through a telephone line.

Figure 5:
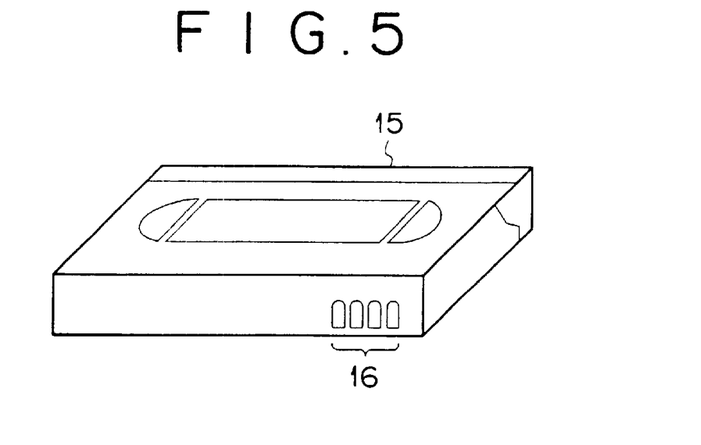
FIG. 5 is a diagram for illustrating a video cassette 15 with a cassette memory.

The video cassette 10 to which the memory card 20 is attached as an auxiliary memory device is described herein above, however alternatively, a video cassette with a cassette memory which has a built-in memory such as EEPROM as an auxiliary memory may be used. In the video cassette 15 with a cassette memory, a contact unit 16 is provided for communication as shown in FIG. 5. Therefore, when a video cassette 15 with a cassette memory is used for the video tape recorder 30, a terminal unit to be connected to the contact unit 16 is provided and the terminal unit is connected to the control unit 50.

Figure 6:
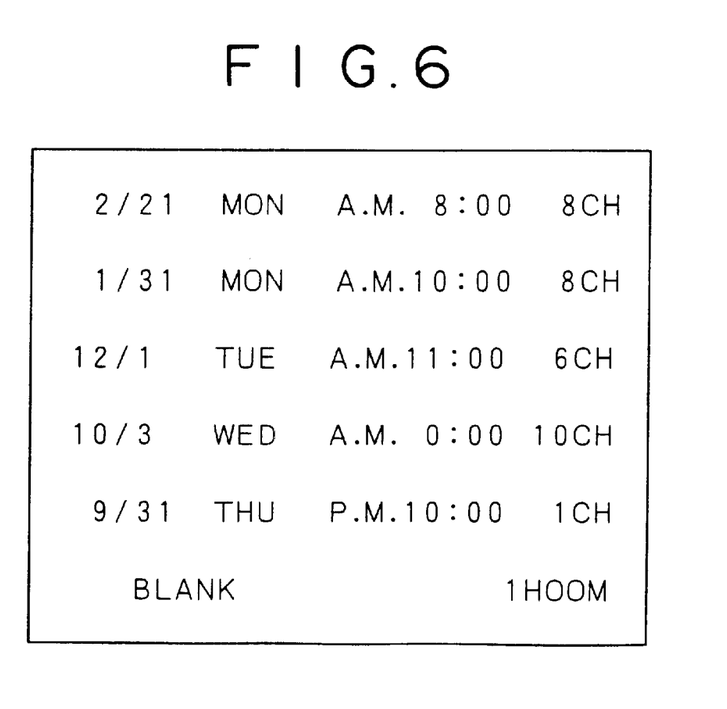
FIG. 6 is a diagram for illustrating a displayed image.

In the video tape recorder 30 having the structure as described herein above, the information of a program, for example, recorded data, record starting time, channel number, and tape record position, recorded in the video cassette in response to the data signal supplied from the control unit 50 is stored in the auxiliary memory device of the video cassette. When a program recorded in the video cassette is to be confirmed, the information of the program is read out from the auxiliary memory device, a control signal CC is generated based on the read out information and supplied to the character generator unit 38. In the character generator unit 38, an image signal VC is generated for displaying the information based on the control signal CC and supplied to the display device 65. Therefore, the information of a program recorded, for example, as shown in FIG. 6 is displayed in the order from recorded data, day of the week, record starting time, to channel number. Further, a blank portion namely the record position of an unnecessary program or un-recorded portion of the video tape is identified based on the information read out from the auxiliary memory device, for example, "blank" display is displayed on the screen for indicating the time (0H00M) of the blank portion having the longest time.

When any of the program and blank displayed on the screen of the display device 65 is selected using the input unit 55, and then a searching operation of the selected program or blank is performed.

In this searching operation of the desired program or blank, the tape position is identified based on the rotation period of the tape reel of the video cassette, the searching operation is performed using the identified tape position and the record position information of the selected program stored in the auxiliary memory device or using the position of un-recorded portion identified based on the position information of the blanked program or the record position information of the program stored in the auxiliary memory device.

Figure 7:
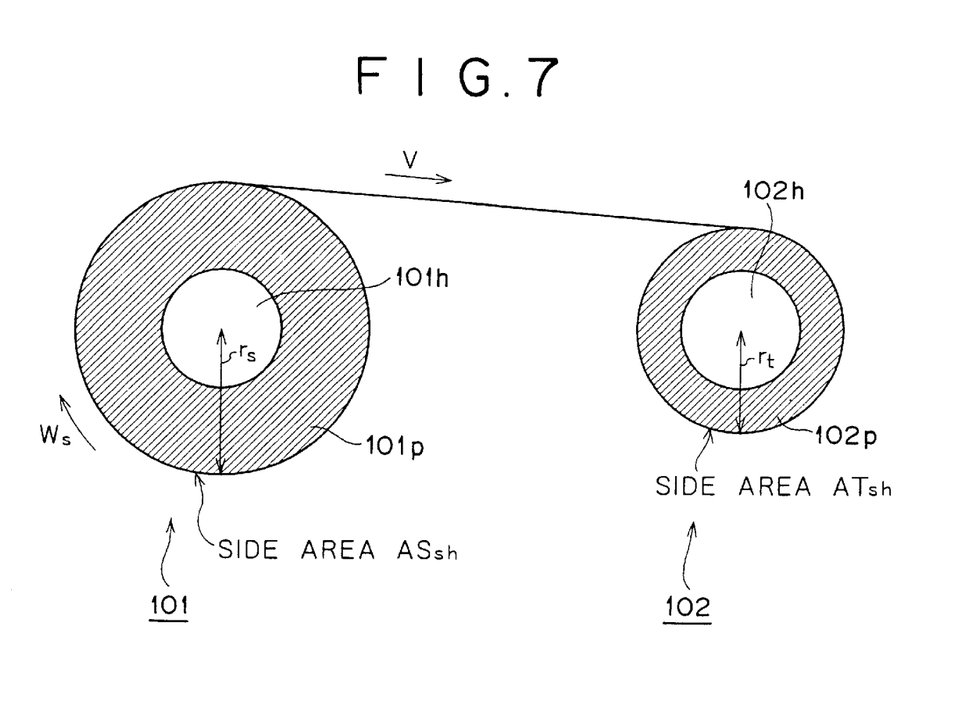
FIG. 7 is a diagram for describing identifying operation of the tape position.

FIG. 7 is a diagram for illustrating an identifying operation of a tape position. In FIG. 7, the side area ASsh of a supply reel (referred to as "S real" hereinafter) 101 is determined from the equation (1), wherein "rs" represents the radius of the outermost periphery of wound tape portion 101p, "V" represents the tape speed, and "ωs" represents the angular speed of the S reel 101.

$$ASs = \pi \times rs^2 \qquad (1)$$

The radius rs of the outermost periphery of the wound tape portion 101p is determined from the equation (3) which is obtained by modifying the equation (2), wherein "Ts" represents the rotational period.

$$V = rs \times \omega s = 2\pi \times (1/Ts) \qquad (2)$$

$$rs = (V Ts)/(2\pi) \qquad (3)$$

As shown by the equation (4) which is obtained by, substituting the equation (3) in the equation (1), the side area ASsh of the S reel 101 is determined from the tape speed V and the rotational period Ts of the S reel 101.

$$ASs = \pi \times ((VTs)/(2\pi))^2 = (1/4\pi) \times V^2 \times Ts^2 \qquad (4)$$

Similarly, the side area ATsh of a T reel 102 is calculated by measuring the rotational period Tt of the take up reel (referred to as "T reel" hereinafter) 102.

Next, when a tape runs for a prescribed time WT at a tape speed V, for example, the side area of the S reel 101 changes from "ASsh1" to "ASsh2". When, the tape length Ld is determined from the equation (5)

$$Ld = V \times WT \qquad (5)$$

Therefore, the tape thickness D is calculated by dividing the change of the side area "ASsh1−ASsh2" by the tape length Ld as shown in FIG. 6

$$D = (ASsh1 - ASsh2)/Ld = (ASsh1 - ASsh2)/V/WT \qquad (6)$$

The change of the side area at a prescribed time WT increases with decreasing of the radius of the outermost periphery of the wound tape portion. Therefore, for calculation of the tape thickness D, use of the side area of a reel with a smaller outermost peripheral radius of the wound tape portion of any of the S reel 101 and the T reel 102 results in high accuracy of the tape thickness D. If the outermost peripheral radius of the wound tape portion of the S reel 101 and T reel 102 is approximately equal, then the change of side area of the S reel 101 and the T reel 102 is approximately equal, therefore the tape thickness D is calculated using the change of side area at a prescribed time TN (for example, 15 minutes).

The tape thickness D is determined as described herein above, then the side area ASsh of the S reel 101 is added to the side area ATsh of the T reel 102, and the total area AA is divided by the tape thickness D to figure out the length LA.

As shown in FIG. 7, the proportion of the side area ASsh of the S reel 101 to the total area AA is multiplied by the length LA to figure out the length LSsh of the S reel side.

$$LSsh = LA \times (ASsh/AA) \qquad (7)$$

The S reel side length LSsh is a length of the tape including the tape wound on a hub 101h of the S reel 101 side. Therefore the length LSh corresponding to the hub 101h is calculated and is subtracted from the S reel side length LSsh, thereby the correct tape length LSs of the tape portion 101p wound on the S reel 101 is calculated.

In VHS video cassette, a hub with a small radius is used for video cassettes of long recording time, on the other hand, a hub with a large radius is used for video cassettes of short recording time. While the tape is running, the added value of the rotational period Ts of the S reel 101 and the rotational period Tt of the T reel 102 becomes a large value if a hub with a large radius is used, on the other hand, becomes a small value if a hub with a small radius is used. Therefore based on the added value of the rotational period Ts of the S reel 101 and the rotational period Tt of the T reel 102, which hub is used is identified.

The side area of a hub with a small radius and a hub with a large radius is calculated previously, and when the hub radius is identified, the side area of the identified hub is divided by the tape thickness D to figure out the length LSh corresponding to the hub 101h of the S reel 101. Further, the length LSh is subtracted from the S reel side length LSsh to figure out the correct tape length LSs of the wound tape portion 101p of the S reel 101.

Because the correct tape length LTs of the T reel 102 is figured out similarly, addition of the tape length LSs and the tape length LTs gives the total tape length L and the recording time of the video cassette. The tape position can be identified based on the tape length LSs or the tape length LTs.

However, if the rotational period of a real is varied, the identifying operation of the tape position as described herein above results in the erroneous identification of the tape position, and the position of a desired program or blank can not be detected correctly. To solve the problem, the position of the desired program or blank is set based on the identified tape position and the record position information stored in the auxiliary memory device, and the detection area of a prescribed time length is set based on the set position. For example, by detecting the portion where a control signal recorded with a program is lost or an index signal which indicates the starting of a program in the detection area, the position of a desired program or blank is detected correctly. A control signal and index signal are recorded on a control track.

Figure 8A:
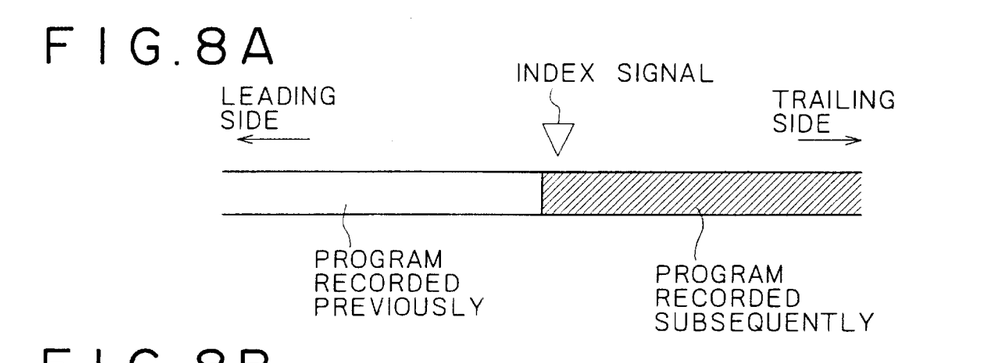
FIGS. 8A to 8D are diagrams for illustrating recording of a program.

In the case that a program is to be recorded in a video cassette, when a new program is recorded subsequently to a program which has been recorded already as shown in FIG. 8A, an index which indicates the record starting position of the new program is recorded.

Figure 8B:
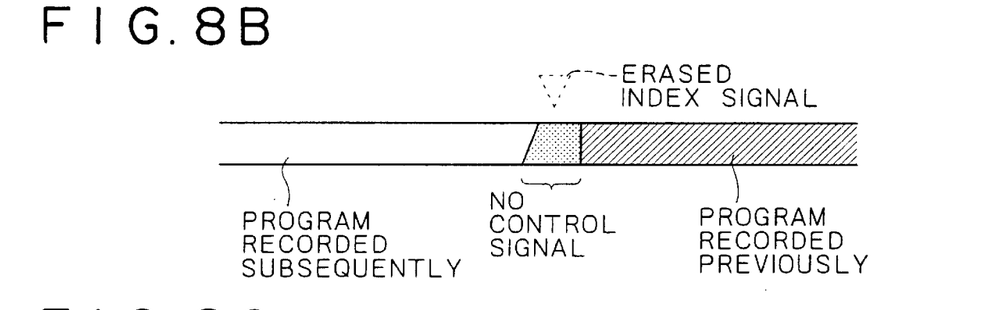

Because a full width erasing head for erasing control signals and a fixed head for recording control signals are disposed with a certain distance, if a new program is recorded on the tape position precedent to the program which has been recorded already, such recording causes the portion where a control signal is not recorded as shown in FIG. 8B. Further, the new program is recorded on the position of the program which has been already recorded, the index signal is erased undesirably.

Figure 8C:
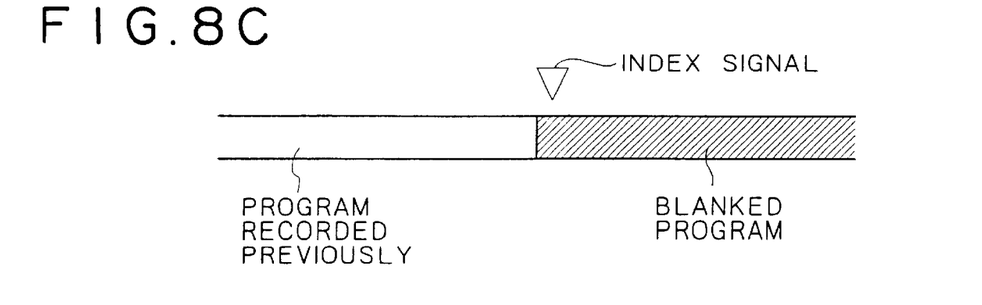
Figure 8D:
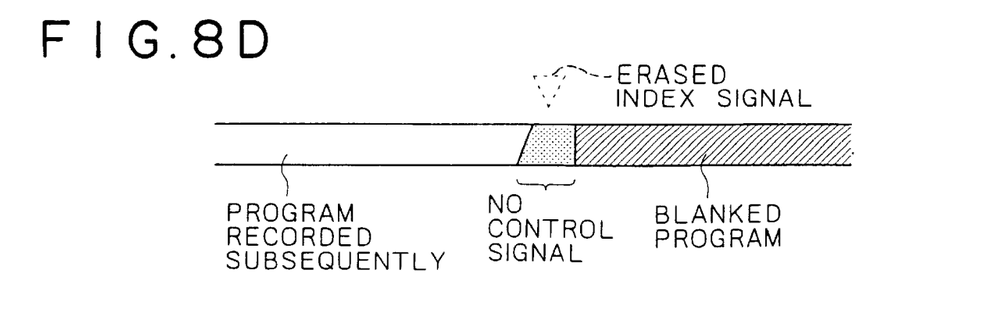

The program which is recorded subsequently to the program which was recorded already becomes unnecessary, the program may be blanked to an area where a new program will be recorded as shown in FIG. 8C. Alternatively,. the program from which the index signal has been erased becomes unnecessary, and the position where the program is recorded may be blanked as shown in FIG. 8D. Searching operation for respective cases will be described successively.

In the case that, for example, a program is selected from a displayed image on the display device 65 and the program is searched, searching operation is performed from the tape trailing side in the detection area.

FIG. 9 shows the case of program searching operation for searching a program wherein the index signal of a program to be searched has been recorded. The desired program PA (0) is recorded subsequently to the program PA (−1) as shown in FIG. 9A, and the index signal which indicates the starting position of the program is recorded.

Figure 9A:
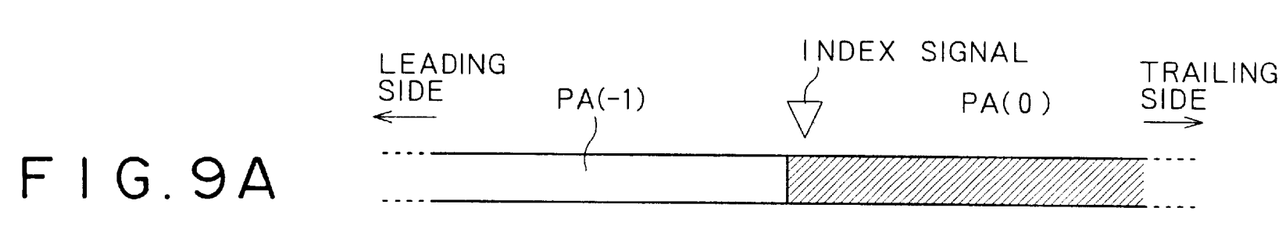
FIGS. 9A to 9D are diagrams for illustrating program searching operation in the case that the index of a program has been recorded.

Because the tape position identification is erroneous as described herein above, the detection area is set based on the starting position of the desired program PA (0) which has been set based on the identified tape position and the record position information stored in the auxiliary memory device.

Figure 9B:
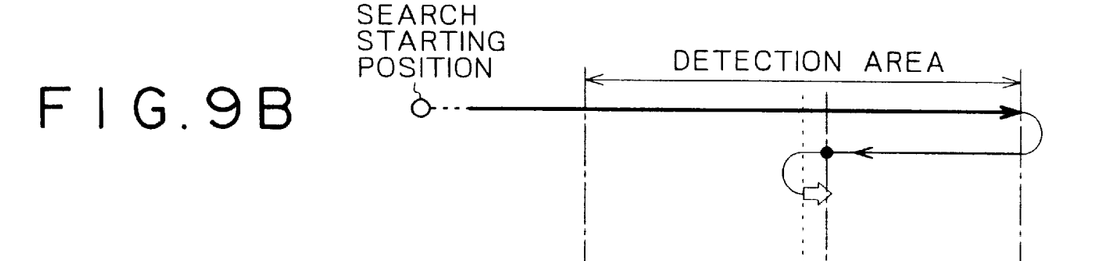

When the program PA (0) is searched, if the search starting position (indicated with ○, the same in FIGS. 10 to 12) is located on the tape leading side with respect to the detection area as shown in FIG. 9B, then the tape is fed fast. When the tape position reaches the tape trailing side of the detection area while the tape is being fed fast, the running direction of the tape is reversed and rewinding reproduction operation is performed. During the rewinding reproduction, the tape speed is kept at such a speed as to be detectable of the index signal and the control signal.

When the index signal is detected during rewinding reproduction operation (indicated with ●, the same in FIG. 11 and FIG. 13), the starting position of the program PA is detected based on the index signal and the searching operation is brought to an end. The tape is brought to a stop at the stop position Qs where a program recorded previously will not be reproduced in consideration of variation of the stop position on the mechanical deck 36. When reproduction operation is started after completion of searching operation, the desired program is reproduced from the beginning without reproduction of the program recorded previously.

Figure 9C:
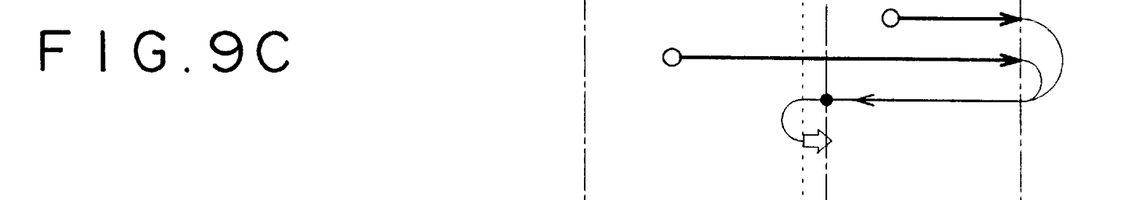

As shown in FIG. 9C, the tape is fed fast also when the search starting position is in the detection area, and when the tape position reaches the tape trailing side of the detection area while the tape is fed fast, the running direction of the tape is reversed, and rewinding reproduction operation is performed. Subsequently in the same manner as shown in FIG. 9B, the starting position of the program PA (0) is detected and the searching operation is brought to an end.

Figure 9D:
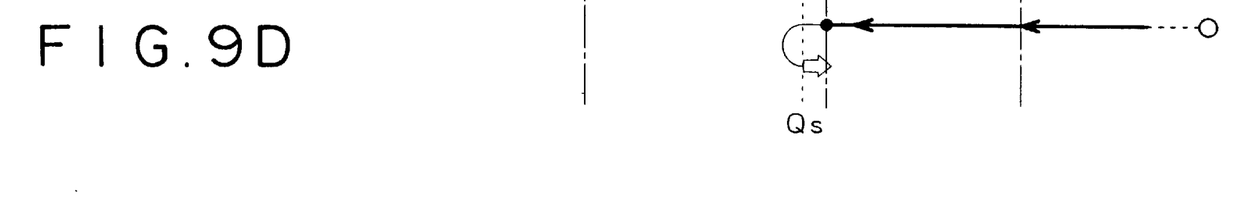

As shown in FIG. 9D, if the search starting position is located on the tape trailing side with respect to the detection area, a tape rewinding is operated. When the tape position reaches the tape trailing side of the detection area while the tape rewinding is operated, the tape running speed is changed to such a speed as to be detectable of the index signal and the control signal, and rewinding reproduction is operated. Afterward, in the same manner as shown in FIG. 9B, the starting position of the program PA (0) is detected and the searching operation is brought to an end.

Figure 10A:
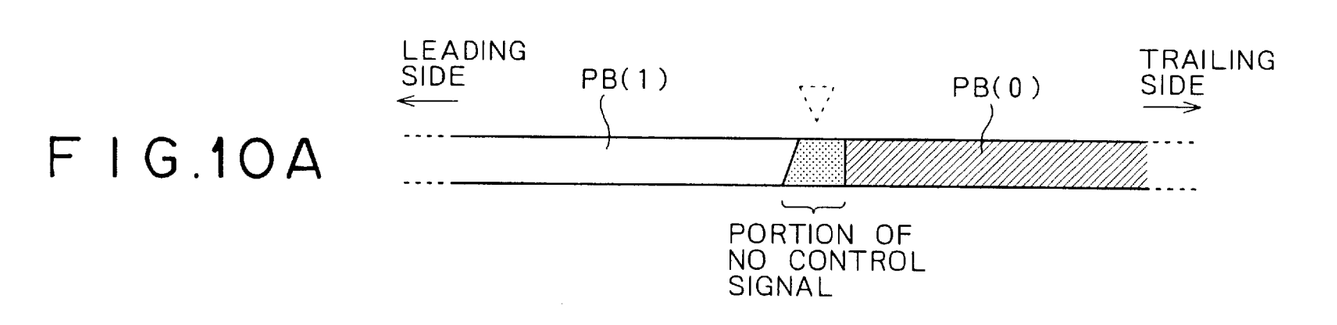
FIGS. 10A to 10D are diagrams for illustrating program searching operation in the case that the index of a program has been erased.

FIG. 10 shows the case of program searching operation wherein the index signal of a program to be searched has been erased. As shown in FIG. 10A, if a program PB (1) is recorded on the tape leading side with respect to a desired program PB (0), the index signal of the program PB (0) is erased, and an area where no control signal is recorded is formed between the program PB (0) and the program PB (1).

Figures 10B, 10C:
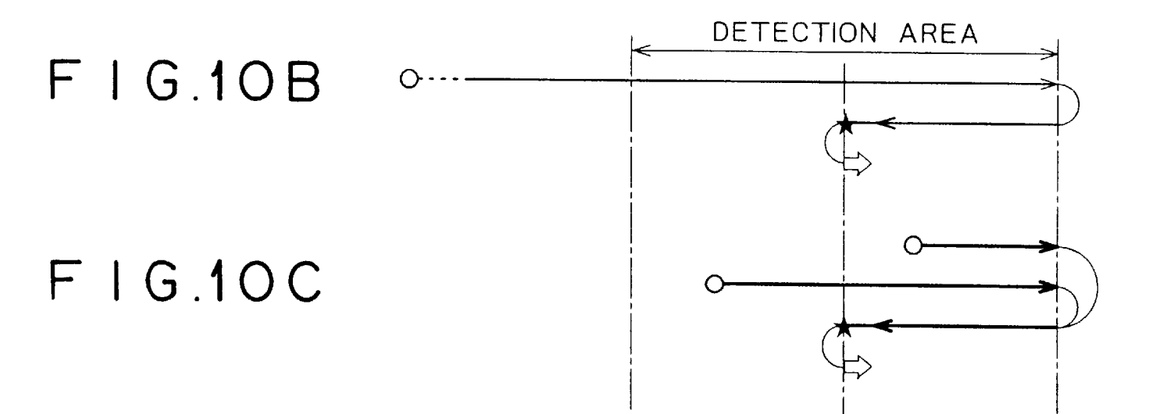

In the case that the program PB (0) is searched, if the search starting position is located on the tape leading side with respect to the detection area as shown in FIG. 10B, the tape is fed fast in the same manner as described in searching of the program PA (0) shown in FIG. 9B. When the tape position reaches the tape trailing side of the detection area while the tape is fed fast, the tape running direction is reversed and rewinding reproduction is operated. The tape speed is kept at such a speed as to be detectable of the index signal and the control signal during the rewinding reproduction.

If no control signal is detected (indicated with ★, the same in FIG. 12 and FIG. 14) during the rewinding reproduction operation, the starting position of the program PB (0) is detected based on the position of no control signal and the searching operation is brought to an end. The tape is brought to a stop at the stop position Qs where a program recorded previously will not be reproduced in consideration of variation of the stop position on the mechanical deck 36 in the same manner as described in searching operation of the program PA (0).

As shown in FIG. 10C, when the tape is fed fast and the tape position reaches the tape trailing side of the detection area while the tape is being fed fast if the search starting position is located in the detection area, the running direction of the tape is reversed and rewinding reproduction is operated. Subsequently in the same manner as shown in FIG. 10B, the starting position of the program PB (0) is detected and the searching operation is brought to an end.

Figure 10D:
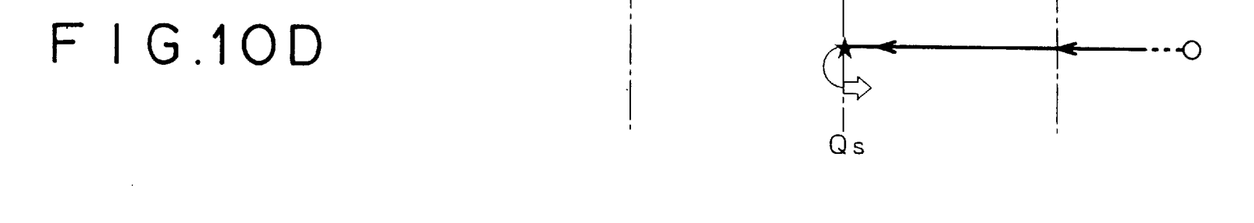

As shown in FIG. 10D, if the search starting position is located on the tape trailing side with respect to the detection area, then tape rewinding is operated. When the tape position reaches the tape trailing side of the detection area while the tape is being rewound, the tape speed is changed to such a speed as to be detectable of the index signal and the control signal and the rewinding reproduction is operated. Afterward, the starting position of the program PB (0) is detected in the same manner as shown in FIG. 10B and the searching operation is brought to an end.

Next, in the case of blank searching operation that, for example, a blank is selected from a displayed image on the display device 65 and the position of the blank is searched, a search is operated from the tape leading side in the detection area.

FIG. 11 shows the case of blank searching operation wherein a program in which the index signal was recorded has been blanked.

Figure 11A:
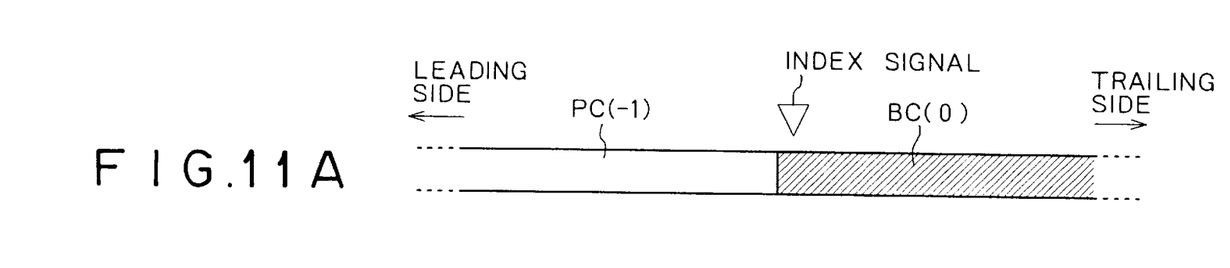
FIGS. 11A to 11D are diagrams for illustrating blank searching operation (first).

A desired blank BC (0) is a blank which has been formed by blanking a program recorded subsequently to a program PC (−1) as shown in FIG. 11A, and the index signal which indicates the starting position has been recorded.

As described herein above, because the tape position identification is erroneous, the detection area is set based on the position of the desired blank BC (0) which has been set based on the identified tape position and the record position information stored in the auxiliary memory device.

Figures 11B, 11C:
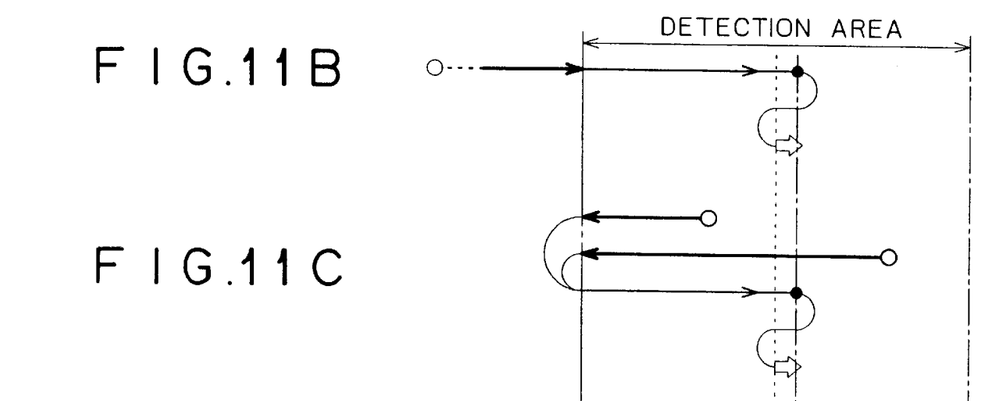

In the case that the blank BC (0) is searched, if the search starting position is located on the tape leading side with respect to the detection area as shown in FIG. 11B, then the tape is fed fast. When the tape position reaches the tape leading side of the detection area while the tape is fed fast, the tape running speed is changed to such a tape speed as detectable of the index signal and the control signal and fast reproduction is operated.

When the index signal is detected in the fast reproduction operation, the position of the blank BC (0) is detected with reference to the index signal and the searching operation is brought to an end. The tape is brought to a stop at the stop position Qt where a program recorded previously will not be reproduced in consideration of variation of the stop position on the mechanical deck 36. Therefore when a recording operation is started after completion of the searching operation, a new program is recorded without any residual unnecessary program.

As shown in FIG. 11C, if the search starting position is located in the detection area, the tape rewinding is operated, when the tape position reaches the tape leading side of the detection area while the tape is rewound, the running direction of the tape is reversed, and a fast reproduction is operated. Subsequently in the same manner as shown in FIG. 11B, the position of the blank BC (0) is detected and the searching operation is brought to an end.

Figure 11D:
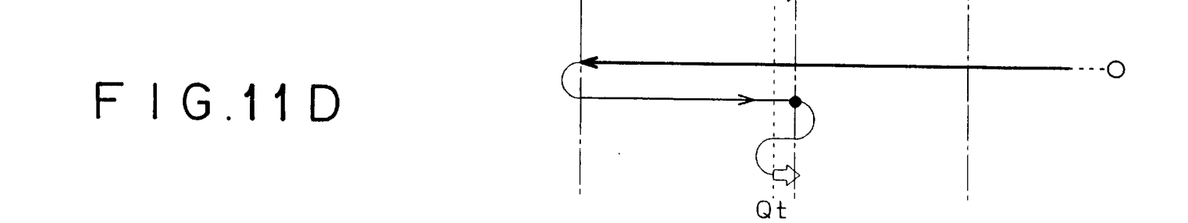

If the search starting position is located on the tape trailing side with respect to the detection area as shown in FIG. 11D, also the tape rewinding is operated, and when the tape position reaches the tape leading side of the detection area while the tape is rewound, then the running direction of the tape is reversed and a fast reproduction is operated. Afterward, the position of the blank BC (0) is detected in the same manner as shown in FIG. 11B and the searching operation is brought to an end.

Figure 12A:
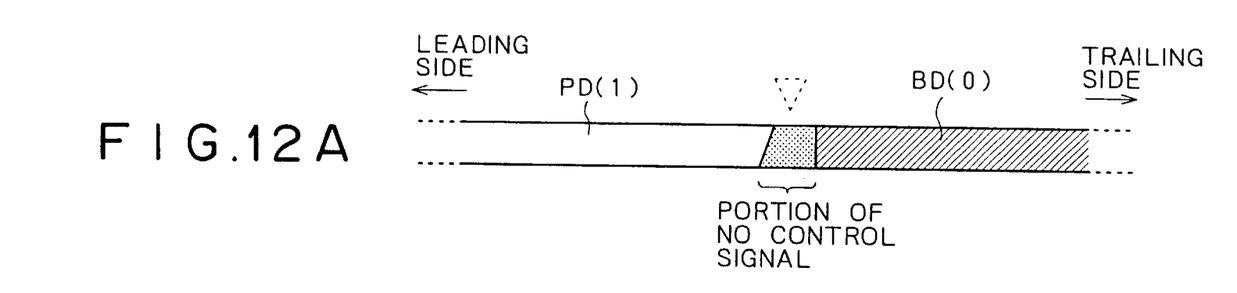
FIGS. 12A to 12D are diagrams for illustrating blank searching operation (second).

FIG. 12 shows a blank searching operation wherein the index of a blanked program is erased. The desired blank BD (0) is a blank resulted from a process in which a program PD (1) is newly recorded and the program from which the index signal has been erased is blanked as shown in FIG. 12A. Further, an area where no control signal is recorded is formed between the program PD (1) and the blank BD (0).

Figures 12B, 12C, 12D:
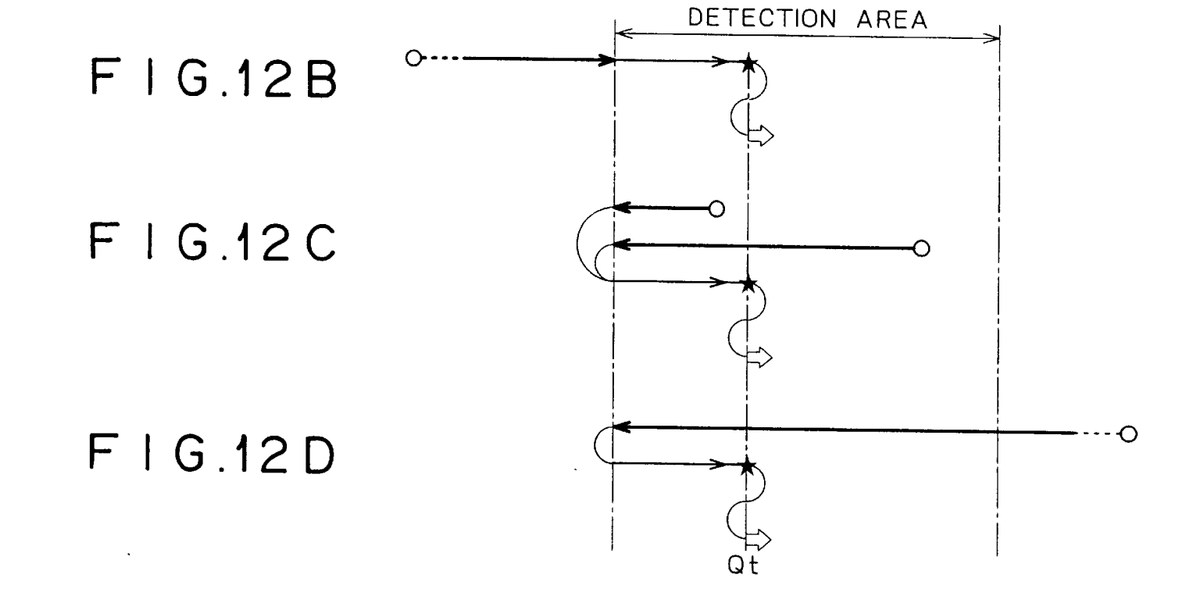

When the blank BD (0) is searched, if the search starting position is located on the tape leading side with respect to the detection area as shown in FIG. 12B, then the tape is fed fast in the same manner as described in searching operation of the position of the blank BC (0) shown in FIG. 11B. When the tape position reaches the tape leading side of the detection area while the tape is fed fast, fast reproduction is operated. The tape running speed is kept in such a tape speed as detectable of the index signal and the control signal while the fast reproduction is operated.

If no control signal is detected during the fast reproduction operation, the position of the blank BD (0) is detected based on the position of no control signal and the searching operation is brought to an end. The tape is brought to a stop at the stop position Qt where the area having no control signal will not be reproduced in consideration of variation of the stop position on the mechanical deck 36. Therefore, if a recording operation is started after the completion of the blank searching operation, a new program is recorded without a residual portion where a signal is not recorded.

As shown in FIG. 12C, if the search starting position is located in the detection area, the tape rewinding is operated, and when the tape position reaches the tape leading side of the detection area during tape rewinding operation, the tape running direction is reversed, and fast reproduction is operated. Subsequently, the blank BC (0) is detected in the same manner as shown in FIG. 12B and the searching operation is brought to an end.

As shown in FIG. 12D, if the search starting position is located on the tape trailing side with respect to the detection area, the tape rewinding is operated when the tape position reaches the tape leading side of the detection area during the tape rewinding operation, the tape running direction is reversed, and a fast reproduction is operated. Subsequently, the position of the blank BC (0) is detected in the same manner as shown in FIG. 12B and the blank searching operation is brought to an end.

Figure 13:
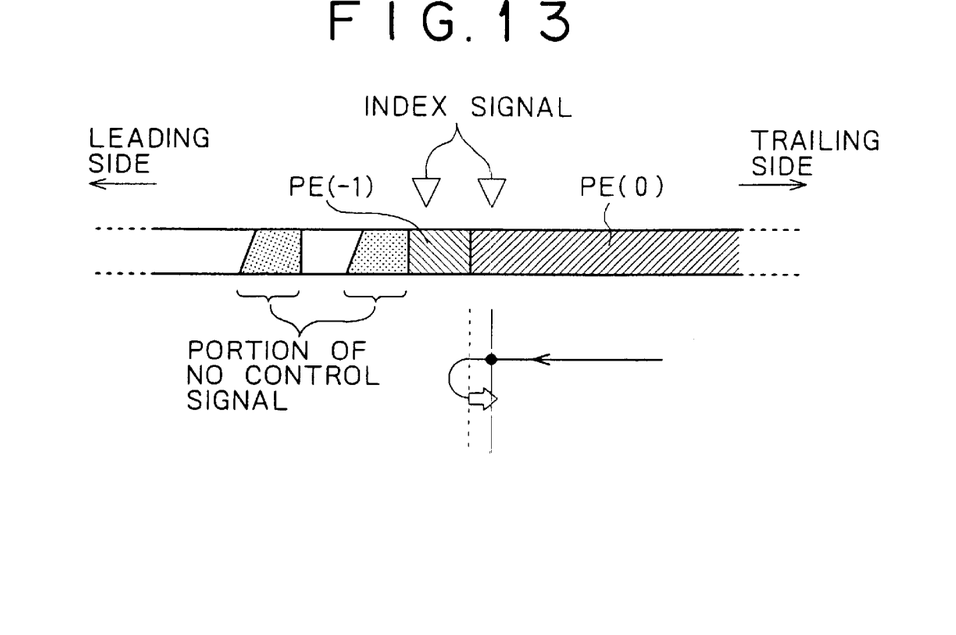
FIG. 13 is a diagram for illustrating program searching operation used when there is no control signal or there is a plurality of index signals in the detection area.

As described herein above, in the program searching operation, detection of an index signal and detection of a portion having no control signal are performed from the tape trailing side, and if any one of a portion having no control signal, a portion having no control signal though having a plurality of index signals, and an index signal is detected first in the detection area, then the position is regarded as the position of the program. Therefore, as shown in FIG. 13, if, for example, the program PE (−1) having a recorded index signal is residual before the desired program PE (0) as shown in FIG. 13, the program PE (−1) is not reproduced, and only the desired program PE (0) is reproduced.

Figure 14:
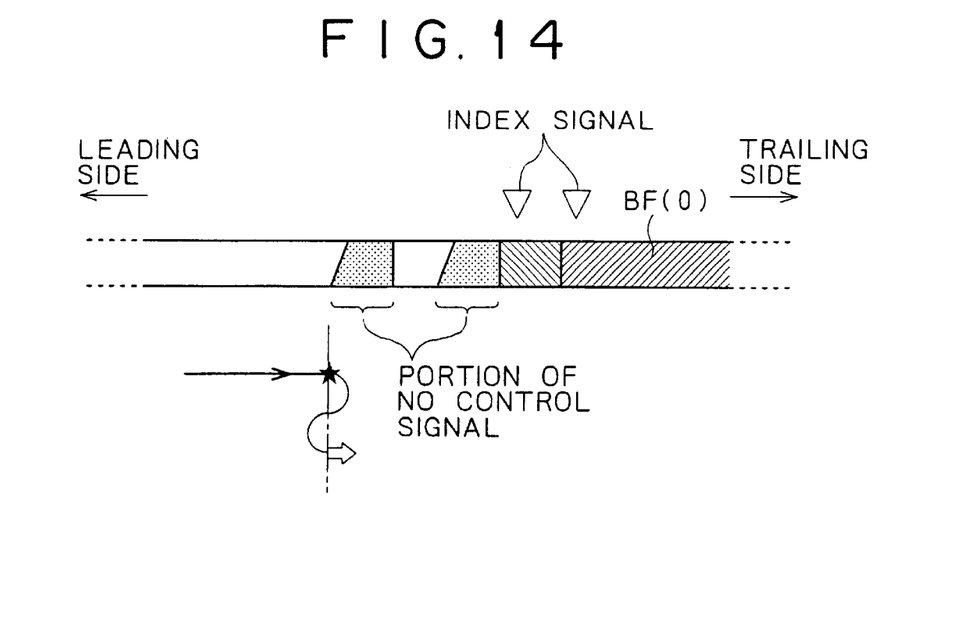
FIG. 14 is a diagram for illustrating blank searching, operation used when there is no control signal or there is a plurality of index signal in the detection area.

On the other hand, in the blank searching operation, detection of an index signal and detection of a portion having no control signal are performed from the tape leading side, and if any one of a portion having no control signal, a portion having no control signal though having a plurality of index signals, and an index signal is detected first, then the position is regarded as the position of the blank. Therefore, if, for example, there is a plurality of portions having no control signal before the blanked program BF (0) or there is the slightly residual program PF (−1) having a recorded index signal, these portions are processed collectively as blank, therefore when a new program is recorded, unnecessary portions having no control signal and unnecessary programs which are recorded before the newly recorded program are prevented from being residual.

In the above-mentioned embodiment, the case that tape fast feeding operation or tape rewinding operation is performed for passing through the detection area is described herein above, however alternatively, in the case that error in identification of the tape position is small and the detection area can be a narrow range, operation performed while the tape position reaches from the search starting position to the tape leading side of the detection area or the tape trailing side of the detection area may be fast feeding reproduction or rewinding reproduction operation which is performed at a slower speed than tape fast feeding operation and tape rewinding operation. In such, for example, the tape running direction is reversed quickly when the tape position reaches the tape leading side or tape trailing side of the detection area, and the next operation is performed. As the result, the operation is smooth and the position can be detected in a short time.

According to the above-mentioned embodiments, the position can be searched only by selecting a displayed program or blank without searching the position of a program or blank by repeating fast feeding reproduction or rewinding reproduction while the displayed image is being viewed. Because when a detection area is set and searching operation is started at the area outside the detection area, the tape speed is changed to such a speed as detectable of the index signal and control signal in the detection area after tape fast feeding operation or tape rewinding operation is performed, the position of the desired program or the position of the blank is searched in a short time. In the above-mentioned embodiment, the case that a program is recorded in a video cassette is described, however the recording medium and the event are by no means limited to the video cassette and the program.

What is claimed is:

1. A recording medium processing device, comprising:
   (A). a recording medium player/recorder for recording an event on a desired portion of a recording medium and for reproducing said desired portion of said recording medium,
   (B). said recording medium player/recorder recording a control signal on said desired portion of said recording medium;
   (C). said desired portion starting at a position corresponding to record position information of said desired portion, and
   (D). said record position information being stored in an auxiliary memory included with said recording medium;
   (E). a display for displaying record position information read out from said auxiliary memory; and
   (F). a controller for controlling operations of said display and said recording medium player/recorder,
   (G). whereby said controller controls said recording medium player/recorder to search for the position of said desired portion by receiving and using the record position information corresponding to said desired portion,
   (H). whereby said controller includes identifying position means to locate a start of a detection area,
   (I). said detection area having an end at a prescribed time following said start,
   (J). said detection area containing an index signal indicating the start of the desired portion of the recording medium and corresponding to a location signal contained in the record position information stored in said auxiliary memory, or an absence of a control signal indicating an area between the start of a desired portion and an end of another portion,
   (K). whereby said controller positions said recording medium at said end of said detection area, and
   (L). whereby said controller rewinds said recording medium until said index signal or said absence of said control signal is found, indicating the start of said desired portion.

2. The recording medium processing device of claim 1, whereby said search is for a desired event contained in the recording medium.

3. The recording medium processing device of claim 2, whereby when said end of said detection area is found, said recording medium player detects said index signal contained in the detection area, said index signal indicating the start of the desired event.

4. The recording medium processing device of claim 2, whereby when said end of said detection area is found, said recording medium player detects the absence of said control signal in said detection area indicating a start of said desired event.

5. The recording medium processing device of claim 1, whereby said search is for a blank portion of said recording medium.

6. The recording medium processing device of claim 5, whereby when said end of said detection area is found, said recording medium player detects said index signal contained in the detection area, said index signal indicating the start of the blank portion.

7. The recording medium processing device of claim 5, whereby when said end of said detection area is found, said recording medium player detects the absence of said control signal in said detection area indicating a start of said blank portion.

8. A recording medium processing method, comprising the steps of:
   (A). recording an event on a desired portion of a recording medium;
   (B). recording a control signal on said desired portion of said recording medium,
   (C). said desired portion starting at a position corresponding to record position information of said desired portion, and
   (D). said record position information being stored in an auxiliary memory included with said recording medium;
   (E). displaying record position information read out from said auxiliary memory;
   (F). controlling said recording medium player/recorder to search for the position of said desired portion by receiving and using the record position information corresponding to said desired portion;
   (G). locating a start of a detection area,
   (H). said detection area having an end at a prescribed time following said start,
   (I). said detection area containing an index signal indicating the start of the desired portion of the recording medium and corresponding to a location signal contained in the record position information stored in said auxiliary memory, or an absence of a control signal indicating an area between the start of a desired portion and an end of another portion;
   (J). positioning said recording medium at said end-of said detection area;
   (K). rewinding said recording medium until said index signal or said absence of said control signal is found, indicating the start of said desired portion; and
   (L). reproducing said desired portion of said recording medium.

9. The recording medium processing method of claim 8, further comprising the step of:
   finding said end of a detection area for a desired event.

10. The recording medium processing method of claim 9, further comprising the step of:
    detecting said index signal contained in the detection area, said index signal indicating the start of the desired event.

11. The recording medium processing method of claim 9, further comprising the step of:

detecting the absence of said control signal in said detection area indicating a start of said desired event.

12. The recording medium processing method of claim 8, further comprising the step of:

finding said end of a detection area for a blank portion of the recording medium.

13. The recording medium processing method of claim 12, further comprising the step of:

detecting said index signal contained in the detection area, said index signal indicating the start of the blank portion.

14. The recording medium processing method of claim 12, further comprising the step of:

detecting the absence of said control signal in said detection area indicating a start of said blank portion.

* * * * *